(12) United States Patent
Michaux et al.

(10) Patent No.: US 7,857,053 B2
(45) Date of Patent: Dec. 28, 2010

(54) CONTROL OF THE PROPERTIES OF CEMENT SLURRIES WITH OPTIMIZED POLYMERS COMBINATION

(75) Inventors: Michel Michaux, Verrieres-le-Buisson (FR); Jean-Philippe Caritey, Le Plessis Robinson (FR); Michel Ermel, St Lambert des Bois (FR); Sylwia Komocki, Chatenay Malabry (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 52 days.

(21) Appl. No.: 12/336,954

(22) Filed: Dec. 17, 2008

(65) Prior Publication Data
US 2009/0183876 A1    Jul. 23, 2009

(30) Foreign Application Priority Data
Dec. 19, 2007    (EP)    ................... 07291569

(51) Int. Cl.
*E21B 33/138*    (2006.01)

(52) U.S. Cl. ...................................... 166/292; 106/805
(58) Field of Classification Search ....................... None
See application file for complete search history.

(56) References Cited

U.S. PATENT DOCUMENTS

| | | | | |
|---|---|---|---|---|
| 4,557,763 A | * | 12/1985 | George et al. | ............... 106/706 |
| 4,674,574 A | * | 6/1987 | Savoly et al. | ............... 166/293 |
| 2005/0034864 A1 | * | 2/2005 | Caveny et al. | ............... 166/293 |
| 2008/0308275 A1 | * | 12/2008 | Brothers et al. | ............. 166/295 |
| 2009/0099047 A1 | * | 4/2009 | Cunningham et al. | ....... 507/207 |

* cited by examiner

*Primary Examiner*—Zakiya W. Bates
(74) *Attorney, Agent, or Firm*—David Cate; Robin Nava; Jeff Griffin

(57) ABSTRACT

A cement slurry composition for cementing a well comprising: a hydraulic cement, water and a combination made of a hydroxyethyl cellulose and an acrylamido-methyl-propane sulfonate-acrylamide copolymer. Provided is also a method for cementing a well involving such cement slurry composition. The composition provides a solution to decouple the fluid-loss control and the slurry rheology for cement for slurry and particularly for extended cement slurry.

13 Claims, No Drawings

CONTROL OF THE PROPERTIES OF CEMENT SLURRIES WITH OPTIMIZED POLYMERS COMBINATION

CROSS-REFERENCE TO RELATED APPLICATIONS

This application claims the benefit of EP Patent Application 07291569.7 filed on Dec. 19, 2007, entitled "Control of the Properties of Cement Slurries with Optimized Polymers Combination."

FIELD OF THE INVENTION

The present invention broadly relates to well cementing. More particularly the invention relates to cementing compositions comprising a mixture of hydroxyethyl cellulose and AMPS/Acrylamide copolymer as well as methods for using such compositions to service a wellbore.

BACKGROUND

When a well such as an oil or gas well has been drilled, it is often desired to isolate the various producing zones from each other or from the well itself in order to stabilize the well or prevent fluid communication between the zones or shut off unwanted fluid production such as water. This isolation is typically achieved by installing a tubular casing in the well and filling the annulus between the outside of the casing and the wall of the well (the formation) with cement. The cement is usually placed in the annulus by pumping slurry of the cement down the casing such that it exits at the bottom of the well and passes back up the outside of the casing to fill the annulus. Various additives can be added to the cement to enhance properties of the slurry or of the set cement, for example fluid-loss control agent, foaming agent, dispersant, retarder, accelerator . . . .

Hydroxyethyl celluloses (HEC) of different molecular weights (Mw) are currently used in oilwell cementing. By way of examples, a low molecular-weight HEC, is used as a fluid-loss control agent in cement slurries having a Solid Volume Fraction (SVF) of about 35% to about 60%. A low/medium molecular-weight HEC is used as a fluid-loss control agent in cement slurries having a SVF of about 20% to about 30% (i.e., extended slurries). And a high molecular-weight HEC, is primarily used as an extender in extended cement slurries. Last one also provides some fluid-loss control.

As well, AMPS-Acrylamide copolymer is used as a fluid-loss control agent in cement slurries having a SVF of about 35% to about 60% (U.S. Pat. No. 6,277,900). It is not frequently used in extended slurries since it does not control properly the fluid-loss rate and does not impart high slurry viscosity.

For instance, the density of cement slurries can be decreased by adding large quantities of water to the cement. An extender has to be added to prevent both the settling of cement particles and the appearance of high amounts of free fluid. Typical extenders are sodium silicates, clays (e.g., bentonite), silica fume and high molecular-weight water-soluble polymers (e.g., polysaccharides). Among these extenders sodium silicates are commonly used. The addition of a retarder is often necessary when sodium silicates, which significantly increase the hydration rate of cement, are used as extender. In the presence of retarder the development of high amounts of free fluid with hydration time can be a major issue. A water-soluble polymer can be used in conjunction with the sodium silicate to stabilize the cement slurry and to decrease the amount of free fluid. A hydroxyethyl cellulose (HEC) of low/medium molecular weight is often used. In addition, this HEC enables to control the fluid-loss rate and to increase the rheology of cement slurry. It is reminded that the viscosity of cement slurry must be high enough to remove properly the drilling mud that has to be displaced by the cement slurry. Unfortunately in many cases use of HEC of low/medium molecular weight does not allow to obtain a satisfactory compromise between the slurry rheology (measured after cement mixing and after slurry conditioning at test temperature), the slurry stability (cement particles settling and free fluid) and the fluid-loss rate.

Therefore, a solution to decouple the fluid-loss control and the slurry rheology is needed for cement slurry and particularly for extended cement slurry.

SUMMARY OF THE INVENTION

According to the invention, a cement slurry composition is disclosed comprising an hydraulic cement, water and a combination made of a hydroxyethyl cellulose (HEC) and an acrylamido-methyl-propane sulfonate (AMPS)-Acrylamide copolymer. The idea is to better decouple the slurry rheology and the fluid-loss control by using two specific water-soluble polymers instead of a single polymer. The slurry rheology and stability are controlled by using a HEC of relatively high molecular weight, while the fluid-loss control is primarily provided by an AMPS-Acrylamide copolymer. Nevertheless, the HEC of higher molecular weight contributes to the fluid-loss control as well. The combination of two selected water-soluble polymers allows to decoupling the slurry rheology (for optimum mud removal and slurry stability) from the fluid-loss control. These two polymers are used separately (i.e., they are not blended together at a fixed ratio) and, therefore, the slurry properties can easily be optimized by changing the polymer concentrations. This combination of polymers can be used with ISO/API Class A, C, G and H cements or with pozzolanic cements (Portland cement blended with pozzolanic materials such as fly ash, blast-furnace slag, calcined clay, diatomaceous earth, silica fume . . . etc). Excellent performances can be obtained within a wide temperature range and wide slurry density range (from 1380 kg/m$^3$ to 1620 kg/m$^3$).

The hydraulic cement is a pozzolanic cement. System of prior art as HEC of low/medium Mw does not work properly with cements containing pozzolanic materials, notably those containing large quantities of blast-furnace slag. The system of the invention provides better fluid-loss control with this type of cement.

In an embodiment, the hydroxyethyl cellulose has a molecular weight between 500,000 and 2,000,000 and preferably between 800,000 and 1,600,000, a concentration by weight of cement between 0.1% to 0.8% and the AMPS-Acrylamide copolymer has a molecular weight between 600,000 and 1,000,000, a concentration by weight of cement between 0.1% to 1%.

Preferably, the slurry has a density of less than 1800 kg/m$^3$. More preferably, the density is between 1300 kg/m$^3$ to 1700 kg/m$^3$.

In another aspect a method of cementing a well comprising the step of pumping a cement slurry as disclosed previously is divulged. The method can further comprises the step of drilling the well and putting a casing, wherein the step of cementing applies to cement the casing.

In a further aspect, it is disclosed a method to control the rheology of a cement slurry composition for cementing a well comprising the steps of: choosing an hydraulic cement; adding to the hydraulic cement, an AMPS-Acrylamide based copolymer; and adding to the hydraulic cement, a hydroxyethyl cellulose based polymer by controlling the ratio of AMPS-Acrylamide based copolymer versus hydroxyethyl cellulose based polymer; and mixing the hydraulic cement and water to form a slurry having a good ISO/API fluid-loss value, preferably below 200 mL/30 min.

In a further aspect, it is disclosed a method to control the fluid loss of a cement slurry composition for cementing a well comprising the steps of: choosing an hydraulic cement; adding to the hydraulic cement, a hydroxyethyl cellulose based polymer; adding to the hydraulic cement, an AMPS-Acrylamide based copolymer by controlling the ratio of hydroxyethyl cellulose based polymer versus AMPS-Acrylamide based copolymer; and mixing the hydraulic cement and water to form a slurry having a good rheology of the slurry allowing the slurry to be pumpable in the well, preferably with a plastic viscosity after conditioning at the test temperature below 200 cP and/or a plastic viscosity after cement mixing is below 300 cP.

Alternatively in both methods, HEC and AMPS-Acrylamide based copolymer can be pre-mixed in the water before mixing with the hydraulic cement.

DETAILED DESCRIPTION

The cement slurry composition of the invention includes a hydraulic cement, water and a combination made of a hydroxyethyl cellulose and an AMPS-Acrylamide copolymer. Hydraulic cements used can be ISO/API Class A, C, G and H cements. Pozzolanic cements are preferred (i.e., Portland cement blended with fly ash, calcined clay, blast-furnace slag, silica fume, or diatomaceous earth). Current invention is based on combination of two selected water-soluble polymers allowing decoupling the slurry rheology and fluid-loss rate. The first polymer is a HEC of relatively high molecular weight around 1,200,000, and the second polymer is an AMPS-Acrylamide copolymer with a molecular weight around 850,000. The slurry rheology and slurry stability are primarily controlled by the first polymer that also provides some fluid-loss control by itself. Excellent fluid-loss control can easily be obtained by adding the second polymer, which has a much lower effect on the slurry rheology than the HEC. In many cases the selected HEC can not be used alone since it is not possible to obtain excellent fluid-loss control without imparting too high slurry viscosity that would make the slurry unmixable and unpumpable in the well. In most cases the AMPS-Acrylamide copolymer can not be used alone since the slurry viscosity is too low to provide proper mud removal. Moreover, the slurry yield stress is close to zero (i.e., overdispersed slurry), resulting in unstable slurries (cement particles settling) and appearance of high amounts of free fluid. The hydroxyethyl cellulose is at a concentration by weight of cement between 0.1% to 0.8% and the AMPS-Acrylamide copolymer is at a concentration by weight of cement between 0.1% to 1%. The total concentration of both polymers varies by weight of cement between 0.4% to 1.6%. Successfully, in most cases the total concentration and cost of the two polymers are lower than that of the HEC of low/medium molecular weight of the prior art.

Regardless of the cement type, excellent fluid-loss control can easily be achieved at slurry density as low as 1380 kg/m$^3$ (i.e., cement slurries containing high quantities of water). Also, cement slurry composition of the invention are in the range of densities between 1300 kg/m$^3$ to 1700 kg/m$^3$.

In another aspect of the invention, it is referred to a method of cementing a well comprising the step of pumping a cement slurry as disclosed herewith. This combination of polymers can be used to cement a well from ambient temperature up to at least 100° C. Wells with higher temperatures up to 150° C. can also be cemented with slight optimization of the two polymers.

In two further aspects, a method to control the rheology of a cement slurry composition and a method to control fluid loss of a cement slurry composition are disclosed. First method comprises the step of mixing dry particles including an hydraulic cement; an AMPS-Acrylamide based copolymer; and a hydroxyethyl cellulose based polymer. The ratio of AMPS-Acrylamide based copolymer versus hydroxyethyl cellulose based polymer is controlled to allow a good fluid-loss value of the slurry. The hydroxyethyl cellulose is at a concentration by weight of cement between 0.1% to 0.8% and the AMPS-Acrylamide copolymer is at a concentration by weight of cement between 0.1% to 1%. The total concentration of both polymers varies by weight of cement between 0.4% to 1.6%. The ISO/API fluid-loss value is preferably below 200 mL/30 min, more preferably below 100 mL/30 min and most advantageously below 50 mL/30 min. This method according to the invention shows the benefit of decoupling rheology and fluid loss.

Second method comprises the steps of: mixing dry particles including an hydraulic cement; a hydroxyethyl cellulose based polymer; and an AMPS-Acrylamide based copolymer. The ratio of hydroxyethyl cellulose based polymer versus AMPS-Acrylamide based copolymer is controlled to allow a good rheology of the slurry allowing the slurry to be pumpable in the well. The hydroxyethyl cellulose is at a concentration by weight of cement between 0.1% to 0.8% and the AMPS-Acrylamide copolymer is at a concentration by weight of cement between 0.1% to 1%. The total concentration of both polymers varies by weight of cement between 0.4% to 1.6%. The plastic viscosity of slurry after conditioning at the test temperature is preferably below 200 cP, more preferably below 150 cP and most advantageously below 100 cP. Also, this method according to the invention shows the benefit of decoupling rheology and fluid loss.

Further embodiments of the present invention can be understood with the appended examples:

EXAMPLES

Three cements have been tested; an ISO/API Class G cement (Dyckerhoff G, Black Label Type)—Tables 1 to 3, a blast-furnace slag cement containing 82 wt % of blast-furnace slag and 18 wt % of Portland cement—Tables 4 to 6, TXI lightweight cement that is composed of Portland cement and calcined clay—Tables 7 to 10. The TXI lightweight cement is significantly finer than the two other cements and, therefore, can be used at lower slurry density without addition of extender (sodium silicate or clay). Cements were mixed with fresh water at the required slurry density. The ISO/API mixing procedure was followed to prepare the cement slurries. All the additives were dry blended with the cement. Retarder used can be a sodium salt of a hydroxycarboxylic acid or a sodium lignosulfonate, dispersant can be a sodium salt of a polynaphthalene sulfonate.

An amount of 250 mL of cement slurry (conditioned for 20 minutes at the test temperature in an atmospheric consistometer rotating at 150 rpm) was poured in a vertical cylinder, and the amount of free fluid was measured after 2 hours. The cylinder was maintained at the test temperature in an oven. The amount of free fluid is given in mL per 250 mL of cement slurry. The conditioned cement slurry was transferred in a fluid-loss cell maintained at the test temperature. The bottom of the cell is a steel screen of 325 mesh. A pressure of 1000 psi was applied on the slurry and the volume of filtrate collected after 30 minutes was multiplied by 2 to get the ISO/API fluid-loss value. An ISO/API fluid-loss value comprised between 100 and 200 is considered as a good result. An ISO/API fluid-loss value comprised between 50 and 100 is considered as a very good result. An ISO/API fluid-loss value below 50 is considered an excellent result, which is particularly difficult to achieve with extended cement slurries that have a low Solid Volume Fraction (SVF) and contain a lot of water.

Tables 1 to 3 refer to an ISO/API Class G cement (Dyckerhoff G, Black Label Type). As such, Table 1 shows cement slurry properties with Dyckerhoff G, Black Label Type cement (1500 kg/m$^3$ density –40° C.); concentration of additives is given by weight of cement (BWOC).

TABLE 1

| Test # | 1 | 2 | 3 | 4 | 5 | 6 | 7 |
| --- | --- | --- | --- | --- | --- | --- | --- |
| Slurry Density (kg/m$^3$) | | | | 1500 | | | |
| Temperature (° C.) | | | | 40 | | | |
| Antifoam Agent | 0.5 | 0.5 | 0.5 | 0.5 | 0.5 | 0.5 | 0.5 |
| Sodium salt of a hydroxycarboxylic acid | 0.15 | 0.15 | 0.15 | 0.15 | 0.15 | 0.15 | 0.15 |
| Sodium Metasilicate | 2 | 2 | 2 | 2 | 2 | 2 | 2 |
| HEC of low/medium Mw | 1 | 1.2 | 1.5 | — | — | — | — |
| HEC of high Mw | — | — | — | 0.3 | 0.3 | 0.4 | 0.4 |
| AMPS-Acrylamide copolymer | — | — | — | 0.4 | 0.5 | 0.5 | 0.6 |
| Mixing Rheology* | | | | | | | |
| 300 rpm | 88 | 129 | 162 | 82 | 107 | 141 | 142 |
| 200 rpm | 70 | 101 | 123 | 62 | 87 | 113 | 114 |
| 100 rpm | 50 | 68 | 82 | 41 | 65 | 83 | 83 |
| 60 rpm | 41 | 53 | 64 | 31 | 55 | 69 | 69 |
| 30 rpm | 35 | 42 | 48 | 24 | 47 | 58 | 57 |
| API Rheology* at 40° C. | | | | | | | |
| 300 rpm | 60 | 80 | 103 | 76 | 63 | 93 | 110 |
| 200 rpm | 45 | 59 | 74 | 54 | 46 | 68 | 80 |
| 100 rpm | 30 | 37 | 43 | 32 | 27 | 40 | 48 |
| 60 rpm | 25 | 27 | 30 | 23 | 18 | 28 | 33 |
| 30 rpm | 20 | 19 | 20 | 15 | 12 | 17 | 20 |
| Free Fluid at 40° C. | 0.4 | 0.3 | 0.1 | 0.2 | 0 | 0 | 0 |
| API Fluid Loss at 40° C. | 278 | 209 | 136 | 204 | 110 | 88 | 74 |

*Note:
the rheology of cement slurries was measured with a Chan 35 rheometer.

Tests 1 to 3 show that the fluid-loss control at 40° C. is improved when increasing the concentration of HEC of low/medium molecular weight. However it is noted that this is accompanied by an increase in slurry viscosity, especially at the mixing stage. With 1.5% BWOC of polymer the fluid-loss control is not very good, and the slurry would become very viscous with higher concentrations of polymer.

Much better results are obtained when HEC of high molecular weight and AMPS-Acrylamide copolymer are used together (Tests 4 to 7). It is noted that very good fluid-loss control can be achieved with lower polymer concentrations (compare Tests 6 and 7 with Test 3). Moreover, it is possible to maintain a good rheology by playing with the ratio between the two polymers. Tests 4 and 5 show that AMPS-Acrylamide copolymer has an important effect on fluid-loss control, whereas Tests 5 and 6 show that HEC of high molecular weight has an important effect on the rheology. Thus, it is possible to decouple the fluid-loss control from the rheology.

Table 2 shows cement slurry properties with Dyckerhoff G, Black Label Type cement (1500 kg/m$^3$ density –50° C. and 85° C.); concentration of additives is given by weight of cement (BWOC).

TABLE 2

| Test # | 8 | 9 | 10 | 11 |
| --- | --- | --- | --- | --- |
| Slurry Density (kg/m$^3$) | | 1500 | | |
| Temperature (° C.) | 50 | | 85 | |
| Antifoam Agent | 0.5 | 0.5 | 0.5 | 0.5 |
| Sodium lignosulfonate | 0.5 | 0.6 | 0.7 | 0.8 |
| Sodium Metasilicate | 1 | 1.5 | 1 | 1.5 |
| HEC of low/medium Mw | 1.5 | — | 1.5 | — |
| HEC of high Mw | — | 0.4 | — | 0.4 |
| AMPS-Acrylamide copolymer | — | 0.6 | — | 0.6 |

TABLE 2-continued

| Test # | 8 | 9 | 10 | 11 |
| --- | --- | --- | --- | --- |
| Mixing Rheology | | | | |
| 300 rpm | 147 | 138 | 140 | 107 |
| 200 rpm | 110 | 94 | 106 | 82 |
| 100 rpm | 66 | 57 | 61 | 53 |
| 60 rpm | 46 | 47 | 41 | 39 |
| 30 rpm | 30 | 33 | 25 | 28 |
| API Rheology at Temperature | | | | |
| 300 rpm | 113 | 115 | 95 | 96 |
| 200 rpm | 85 | 82 | 74 | 70 |
| 100 rpm | 53 | 59 | 50 | 43 |
| 60 rpm | 38 | 47 | 40 | 30 |
| 30 rpm | 26 | 33 | 30 | 18 |
| Free Fluid at Temperature | 0 | 0 | 0 | 0 |
| API Fluid Loss at Temperature | 108 | 44 | 277 | 54 |

Table 2 shows that the results obtained at 50° C. and 85° C. for the same slurry density (i.e., 1500 kg/m$^3$) are in good agreement with those obtained at 40° C. (see Table 1). Poor fluid-loss control is obtained with 1.5% BWOC of HEC of low/medium molecular weight at 85° C. Excellent fluid-loss control is achieved with 0.6% BWOC of AMPS-Acrylamide copolymer used in combination with 0.4% BWOC of HEC of high molecular weight. The viscosity of these slurries is not higher than that of slurries containing the HEC of low/medium molecular weight.

Table 3 shows cement slurry properties with Dyckerhoff G, Black Label Type cement (1380 kg/m³ and 1620 kg/m³ density –85° C.); concentration of additives is given by weight of cement (BWOC).

TABLE 3

| Test # | 12 | 13 | 14 | 15 |
|---|---|---|---|---|
| Slurry Density (kg/m³) | 1380 | 1380 | 1620 | 1620 |
| Temperature (° C.) | 85 | 85 | 85 | 85 |
| Antifoam Agent | 0.5 | 0.5 | 0.4 | 0.4 |
| Sodium salt of a hydroxycarboxylic acid | 0.4 | 0.4 | 0.4 | 0.4 |
| Sodium Metasilicate | 2.5 | 2.5 | 0.8 | 0.8 |
| HEC of low/medium Mw | 1.8 | — | 1.3 | — |
| HEC of high Mw | — | 0.5 | — | 0.3 |
| AMPS-Acrylamide copolymer | — | 1 | — | 0.7 |
| Mixing Rheology | | | | |
| 300 rpm | 98 | 105 | 253 | 158 |
| 200 rpm | 75 | 84 | 190 | 126 |
| 100 rpm | 47 | 58 | 117 | 79 |
| 60 rpm | 35 | 43 | 82 | 57 |
| 30 rpm | 25 | 30 | 51 | 37 |
| API Rheology at 85° C. | | | | |
| 300 rpm | 34 | 65 | 71 | 125 |
| 200 rpm | 25 | 49 | 50 | 93 |
| 100 rpm | 17 | 28 | 30 | 57 |
| 60 rpm | 13 | 19 | 20 | 40 |
| 30 rpm | 10 | 11 | 13 | 25 |
| Free Fluid at 85° C. | 1 | 0 | 1 | 0 |
| API Fluid Loss at 85° C. | 102 | 58 | 241 | 47 |

In Table 3, the concentration of HEC of low/medium molecular weight has to be increased to 1.8% BWOC to obtain an acceptable fluid-loss control at 1380 kg/m³ density (Test 12). Nevertheless it is noted that the slurry viscosity is relatively low after conditioning at 85° C. In many cases higher viscosity is required to provide proper mud removal in wide annuli where the cement slurry can not be displaced in turbulent flow (it is displaced in laminar flow). The fluid-loss control is much better when using 1% BWOC of AMPS-Acrylamide copolymer in combination with 0.5% BWOC of HEC of high molecular weight (Test 13). It is noted that the drop in viscosity after slurry conditioning at 85° C. is less important than for the HEC of low/medium molecular weight. At a density of 1620 kg/m³ the concentration of HEC of low/medium molecular weight has to be decreased to 1.3% BWOC since the slurry is very viscous at the mixing stage (Test 14). This concentration does not allow to obtaining a good fluid-loss control. An excellent fluid-loss control can be achieved with HEC of high molecular weight/AMPS-Acrylamide copolymer combination (Test 15). It is noted that the slurry viscosity at the mixing stage is considerably lower than with HEC of low/medium molecular weight. Actually the drop in viscosity after slurry conditioning at 85° C. is much less important. This is considered as beneficial with regard to mud removal.

Tables 4 to 6 refer to a blast-furnace slag cement containing 82 wt % of blast-furnace slag and 18 wt % of Portland cement. As such, Table 4 shows cement slurry properties with Blast-Furnace Slag cement (1500 kg/m³ density –85° C.); concentration of additives is given by weight of cement (BWOC).

TABLE 4

| Test # | 16 | 17 | 18 | 19 | 20 | 21 | 22 |
|---|---|---|---|---|---|---|---|
| Slurry Density (kg/m³) | 1500 | 1500 | 1500 | 1500 | 1500 | 1500 | 1500 |
| Temperature (° C.) | 85 | 85 | 85 | 85 | 85 | 85 | 85 |
| Antifoam Agent | 0.5 | 0.5 | 0.5 | 0.5 | 0.5 | 0.5 | 0.5 |
| Sodium salt of a hydroxycarboxylic acid | 0.47 | 0.47 | 0.47 | 0.47 | 0.47 | 0.47 | 0.47 |
| Sodium Metasilicate | 2 | 2 | 2 | 2 | 2 | 2 | 2 |
| HEC of low/medium Mw | 1.5 | — | — | — | — | — | — |
| HEC of high Mw | — | — | 0.2 | 0.4 | 0.4 | 0.4 | 0.4 |
| AMPS-Acrylamide copolymer | — | 1 | 1 | 1 | 0.7 | 0.5 | 0.3 |
| Mixing Rheology | | | | | | | |
| 300 rpm | 178 | 39 | 93 | 167 | 138 | 118 | 107 |
| 200 rpm | 135 | 29 | 68 | 127 | 105 | 90 | 82 |
| 100 rpm | 81 | 18 | 41 | 80 | 66 | 57 | 51 |
| 60 rpm | 57 | 13 | 29 | 57 | 47 | 42 | 36 |
| 30 rpm | 35 | 10 | 19 | 36 | 30 | 28 | 24 |
| API Rheology at 85° C. | | | | | | | |
| 300 rpm | 65 | 20 | 57 | 106 | 85 | 82 | 67 |
| 200 rpm | 46 | 15 | 41 | 77 | 62 | 58 | 48 |
| 100 rpm | 28 | 8 | 23 | 45 | 36 | 34 | 28 |
| 60 rpm | 20 | 6 | 15 | 30 | 24 | 22 | 20 |
| 30 rpm | 13 | 4 | 9 | 17 | 15 | 13 | 12 |
| Free Fluid at 85° C. | 0 | 20 | 1 | 0 | 0 | 0 | 0 |
| API Fluid Loss at 85° C. | 147 | — | 65 | 56 | 70 | 98 | 177 |

Test 16 shows that 1.5% BWOC of HEC of low/medium molecular weight provides an acceptable fluid-loss control (147 mL/30 min) at 85° C. when the slurry is designed at 1500 kg/m³ density. However the slurry is quite viscous at the mixing stage and its viscosity decreases significantly after conditioning at 85° C. Test 17 shows that the slurry viscosity is very low, especially after conditioning, when 1% BWOC of AMPS-Acrylamide copolymer is used alone. The slurry is unstable (severe cement settling was observed in the cup of rheometer) and a high amount of free fluid is measured after 2 hours. As a consequence the fluid loss of this slurry was not measured. Tests 18 and 19 show that the slurry viscosity increases significantly when adding 0.2% and 0.4% BWOC of HEC of high molecular weight that already contains 1% BWOC of AMPS-Acrylamide copolymer. The free fluid is eliminated and a very good fluid-loss control is obtained. Tests 20 to 22 indicate that the level of fluid-loss control can be varied by decreasing the concentration of AMPS-Acrylamide copolymer. The slurry viscosity slightly decreases but remains high enough to provide proper mud removal.

Table 5 shows cement slurry properties with Blast-Furnace Slag cement (1500 kg/m³ density –50° C., 85° C. and 100° C.); concentration of additives is given by weight of cement (BWOC).

TABLE 5

| Test # | 23 | 24 | 25 | 26 | 27 | 28 | 29 |
|---|---|---|---|---|---|---|---|
| Slurry Density (kg/m³) | | | | 1500 | | | |
| Temperature (° C.) | 50 | | 85 | | | 100 | |
| Antifoam Agent | 0.5 | 0.5 | 0.5 | 0.5 | 0.5 | 0.5 | 0.5 |
| Sodium salt of a hydroxycarboxylic acid | — | — | — | — | 0.47 | 0.47 | 0.47 |
| Sodium lignosulfonate | 0.8 | 0.6 | 1 | 1 | — | — | — |
| Sodium Metasilicate | 0.8 | 0.8 | 0.8 | 0.8 | 2 | 2 | 2 |
| HEC of low/medium Mw | 1.5 | — | 1.5 | — | 1.8 | — | — |
| HEC of high Mw | — | 0.4 | — | 0.4 | — | 0.4 | 0.4 |
| AMPS-Acrylamide copolymer | — | 0.6 | — | 0.6 | — | 1 | 0.6 |
| Mixing Rheology | | | | | | | |
| 300 rpm | 217 | 152 | 219 | 146 | 240 | 167 | 153 |
| 200 rpm | 161 | 110 | 161 | 110 | 178 | 127 | 117 |
| 100 rpm | 95 | 76 | 85 | 63 | 108 | 80 | 77 |
| 60 rpm | 65 | 54 | 65 | 39 | 75 | 57 | 56 |
| 30 rpm | 38 | 35 | 38 | 22 | 48 | 36 | 38 |
| API Rheology at 50° C. or 85° C. | | | | | | | |
| 300 rpm | 140 | 139 | 70 | 97 | 155 | 106 | 100 |
| 200 rpm | 98 | 103 | 47 | 70 | 110 | 77 | 73 |
| 100 rpm | 56 | 65 | 25 | 41 | 66 | 45 | 43 |
| 60 rpm | 37 | 44 | 16 | 28 | 47 | 30 | 28 |
| 30 rpm | 23 | 26 | 9 | 15 | 32 | 17 | 17 |
| Free Fluid at 50° C. or 85° C. | 0 | 0 | 0 | 0 | 0 | 0 | 0 |
| API Fluid Loss at Temperature | 216 | 84 | 382 | 66 | 285 | 36 | 50 |

It is noted that it is not possible to obtain good fluid-loss control with HEC of low/medium molecular weight (Tests 23, 25 and 27). It is difficult to increase the polymer concentration since the slurry viscosity at the mixing stage would become too high. This is not an issue when using the combination of HEC of high molecular weight and AMPS-Acrylamide copolymer (Tests 24, 26, 28 and 29). Excellent fluid-loss control can still be obtained at temperature as high as 100° C. (Tests 28 and 29).

Table 6 shows cement slurry properties with Blast-Furnace Slag cement (1380 kg/m³ and 1620 kg/m³ density –85° C.); concentration of additives is given by weight of cement (BWOC).

TABLE 6

| Test # | 30 | 31 | 32 | 33 |
|---|---|---|---|---|
| Slurry Density (kg/m³) | 1380 | | 1620 | |
| Temperature (° C.) | | 85 | | |
| Antifoam Agent | 0.5 | 0.5 | 0.4 | 0.4 |
| Sodium salt of a hydroxycarboxylic acid | 0.4 | 0.47 | 0.4 | 0.47 |
| Sodium Metasilicate | 1.8 | 2.2 | 0.6 | 0.5 |
| HEC of low/medium Mw | 2.2 | — | 1.3 | — |
| HEC of high Mw | — | 0.5 | — | 0.2 |
| AMPS-Acrylamide copolymer | — | 1 | — | 0.7 |
| Mixing Rheology | | | | |
| 300 rpm | 152 | 91 | >300 | 213 |
| 200 rpm | 113 | 70 | >300 | 159 |
| 100 rpm | 68 | 43 | 210 | 97 |
| 60 rpm | 47 | 31 | 147 | 68 |
| 30 rpm | 29 | 20 | 88 | 42 |
| API Rheology at 85° C. | | | | |
| 300 rpm | 59 | 67 | 133 | 130 |
| 200 rpm | 41 | 48 | 95 | 95 |
| 100 rpm | 25 | 28 | 55 | 57 |

TABLE 6-continued

| Test # | 30 | 31 | 32 | 33 |
|---|---|---|---|---|
| 60 rpm | 17 | 19 | 37 | 39 |
| 30 rpm | 11 | 10 | 23 | 23 |
| Free Fluid at 85° C. | 0.8 | 0 | 0 | 0 |
| API Fluid Loss at 85° C. | 235 | 69 | 371 | 53 |

Results obtained at 85° C. at lower and higher slurry densities (1380 and 1620 kg/m³) are reported in Table 6. Poor fluid-loss control is obtained with HEC of low/medium molecular weight (Tests 30 and 32). It is noted that at 1620 kg/m³ density the viscosity measured after slurry mixing is completely unacceptable (such cement slurry is not pumpable in a well). The combination of HEC of high molecular weight and AMPS-Acrylamide copolymer gives much better results at lower polymer concentration (Tests 31 and 33).

Tables 7 to 10 refer to TXI lightweight cement that is composed of Portland cement and calcined clay. As such, Table 7 shows cement slurry properties with TXI Lightweight cement (1380 kg/m³ and 1500 kg/m³ density –40° C. and 85° C.); concentration of additives is given by weight of cement (BWOC).

TABLE 7

| Test # | 34 | 35 | 36 | 37 | 38 | 39 |
|---|---|---|---|---|---|---|
| Slurry Density (kg/m³) | | | 1380 | | 1500 | |
| Temperature (° C.) | | 40 | | | 85 | |
| Antifoam Agent | 0.5 | 0.5 | 0.5 | 0.5 | 0.5 | 0.5 |
| Sodium salt of a hydroxycarboxylic acid | — | — | 0.47 | 0.47 | 0.19 | 0.19 |
| Sodium Metasilicate | 1 | 1 | 1 | 1 | 0.8 | 0.8 |
| HEC of low/medium Mw | 2 | — | 2 | — | 1.5 | — |
| HEC of high Mw | — | 0.5 | — | 0.4 | — | 0.4 |
| AMPS-Acrylamide copolymer | — | 1 | — | 1 | — | 0.6 |
| Mixing Rheology | | | | | | |
| 300 rpm | 155 | 120 | 163 | 90 | 267 | 185 |
| 200 rpm | 113 | 93 | 120 | 68 | 202 | 141 |
| 100 rpm | 69 | 60 | 73 | 43 | 125 | 93 |
| 60 rpm | 50 | 45 | 52 | 30 | 91 | 68 |
| 30 rpm | 33 | 30 | 33 | 20 | 60 | 47 |
| API Rheology at Temperature | | | | | | |
| 300 rpm | 116 | 114 | 42 | 65 | 192 | 120 |
| 200 rpm | 86 | 87 | 31 | 48 | 152 | 85 |
| 100 rpm | 52 | 55 | 18 | 30 | 109 | 53 |
| 60 rpm | 36 | 39 | 13 | 20 | 90 | 38 |
| 30 rpm | 23 | 25 | 8 | 13 | 72 | 24 |
| Free Fluid at Temperature | 0 | 0 | 0 | 0 | 0 | 0 |
| API Fluid Loss at Temperature | 87 | 43 | 105 | 48 | 78 | 51 |

At 1380 kg/m³ slurry density the addition of 2% BWOC of HEC of low/medium molecular weight gives good fluid-loss control at both 40° C. and 85° C. (Tests 34 and 36). However it can be noted that the drop in slurry viscosity is very important at 85° C. So higher concentration of HEC of low/medium molecular weight would be required to get higher viscosity, but the viscosity at the mixing stage would be increased. Excellent fluid-loss control can be achieved with the combination of HEC of high molecular weight and AMPS-Acrylamide copolymer (Tests 35 and 37). Again it is noted that the drop in viscosity after slurry conditioning is much less important than with HEC of low/medium molecular weight. At 1500 kg/m³ slurry density and 85° C. HEC of low/medium molecular weight provides a good fluid-loss control but the slurry viscosity after cement mixing is very high (Test 38). Better rheology and fluid-loss control are obtained with the combination of HEC of high molecular weight and AMPS-Acrylamide copolymer (Test 39).

Table 8 shows cement slurry properties with TXI Lightweight cement (1500 kg/m³ density –50° C.); concentration of additives is given by weight of cement (BWOC).

TABLE 8

| Test # | 40 | 41 | 42 | 43 | 44 | 45 | 46 |
|---|---|---|---|---|---|---|---|
| Slurry Density (kg/m³) | | | | 1500 | | | |
| Temperature (° C.) | | | | 50 | | | |
| Antifoam Agent | 0.5 | 0.5 | 0.5 | 0.5 | 0.5 | 0.5 | 0.5 |
| Sodium lignosulfonate | 0.15 | 0.1 | 0.15 | 0.1 | 0.12 | 0.12 | 0.15 |
| Sodium salt of a polynaphtalene sulfonate | 0.5 | 0.5 | — | 0.4 | 0.4 | 0.4 | 0.4 |
| HEC of low/medium Mw | 1.5 | 1 | — | — | — | — | — |
| HEC of high Mw | — | — | — | 0.4 | 0.4 | 0.45 | 0.45 |
| AMPS-Acrylamide copolymer | — | — | 0.5 | 0.5 | 0.2 | 0.1 | — |
| Mixing Rheology | | | | | | | |
| 300 rpm | 180 | 81 | 14 | 102 | 83 | 84 | 78 |
| 200 rpm | 132 | 58 | 10 | 78 | 62 | 63 | 59 |
| 100 rpm | 76 | 32 | 6 | 49 | 37 | 39 | 37 |
| 60 rpm | 49 | 21 | 4 | 34 | 26 | 27 | 26 |
| 30 rpm | 28 | 12 | 3 | 20 | 16 | 17 | 17 |
| API Rheology at 50° C. | | | | | | | |
| 300 rpm | 124 | 49 | 12 | 97 | 69 | 72 | 74 |
| 200 rpm | 89 | 35 | 8 | 72 | 48 | 52 | 54 |
| 100 rpm | 50 | 19 | 4 | 43 | 28 | 30 | 33 |

TABLE 8-continued

| Test # | 40 | 41 | 42 | 43 | 44 | 45 | 46 |
|---|---|---|---|---|---|---|---|
| 60 rpm | 32 | 14 | 3 | 30 | 19 | 21 | 23 |
| 30 rpm | 19 | 8 | 2 | 17 | 11 | 12 | 15 |
| Free Fluid at 50° C. | 0 | 0 | 6 | 0 | 0 | 0 | 0 |
| API Fluid Loss at 50° C. | 68 | 138 | 183 | 46 | 73 | 86 | 148 |

Test 40 shows that 1.5% BWOC of HEC of low/medium molecular weight gives a very good fluid-loss control, but the slurry viscosity at the mixing stage is quite high. The viscosity is significantly lower with 1% BWOC but the ISO/API fluid-loss value is doubled (Test 41). Test 42 shows that the slurry viscosity is very low when using 0.5% BWOC of AMPS-Acrylamide copolymer. The yield stress is close to zero and the slurry is not stable, resulting in the appearance of free fluid. The fluid-loss control is not very good. Higher concentrations of AMPS-Acrylamide copolymer would improve the fluid-loss control but the slurries would remain unstable due to too low viscosity and yield stress (even though the dispersant is removed). Actually AMPS-Acrylamide copolymer is commonly used as a fluid-loss control agent in non-extended cement slurries (i.e., at higher Solid Volume Fraction). The addition of 0.4% BWOC of HEC of high molecular weight and 0.4% BWOC of dispersant (sodium salt of a polynaphthalene sulfonate) increases both the viscosity and yield stress of slurry and eliminates the free fluid (Test 43). An excellent fluid-loss control is achieved. Tests 44 and 45 show that the performance remains very good when the concentration of AMPS-Acrylamide copolymer is considerably decreased. Contrary to what is experienced with HEC of low/medium molecular weight (see Test 41) the viscosity does not decrease significantly after conditioning of slurry at 50° C. Tests 45 and 46 show that the presence of a small amount of AMPS-Acrylamide copolymer (only 0.1% BWOC) is very beneficial in terms of fluid-loss control. These two tests also confirm that the slurry viscosity is mainly due to the presence of HEC of high molecular weight.

Table 9 shows cement slurry properties with TXI Lightweight cement (1500 kg/m$^3$ density –85° C.); concentration of additives is given by weight of cement (BWOC).

TABLE 9

| Test # | 47 | 48 | 49 | 50 | 51 | 52 | 53 | 54 |
|---|---|---|---|---|---|---|---|---|
| Slurry Density (kg/m$^3$) | | | | 1500 | | | | |
| Temperature (° C.) | | | | 85 | | | | |
| Antifoam Agent | 0.5 | 0.5 | 0.5 | 0.5 | 0.5 | 0.5 | 0.5 | 0.5 |
| Sodium lignosulfonate | 0.3 | 0.3 | 0.4 | 0.3 | 0.2 | 0.3 | 0.3 | 0.3 |
| Sodium salt of a polynaphthalene sulfonate | 0.5 | 0.4 | — | 0.5 | 0.4 | 0.4 | 0.4 | 0.4 |
| HEC of low/medium Mw | 1.5 | 1.2 | — | — | — | — | — | — |
| HEC of high Mw | — | — | — | 0.4 | 0.4 | 0.5 | 0.5 | 0.5 |
| AMPS-Acrylamide copolymer | — | — | 0.6 | 0.6 | 0.5 | 0.3 | 0.15 | — |
| Mixing Rheology | | | | | | | | |
| 300 rpm | 202 | 114 | 20 | 112 | 103 | 122 | 100 | 98 |
| 200 rpm | 149 | 82 | 15 | 85 | 80 | 95 | 77 | 76 |
| 100 rpm | 86 | 47 | 9 | 53 | 49 | 62 | 48 | 50 |
| 60 rpm | 55 | 30 | 6 | 37 | 34 | 44 | 35 | 35 |
| 30 rpm | 33 | 17 | 4 | 22 | 21 | 29 | 23 | 24 |
| API Rheology at 85° C. | | | | | | | | |
| 300 rpm | 83 | 52 | 17 | 83 | 87 | 81 | 70 | 65 |
| 200 rpm | 57 | 33 | 12 | 59 | 62 | 59 | 49 | 48 |
| 100 rpm | 33 | 19 | 7 | 34 | 35 | 35 | 28 | 31 |
| 60 rpm | 22 | 14 | 4 | 23 | 24 | 23 | 18 | 23 |
| 30 rpm | 13 | 9 | 2 | 13 | 13 | 14 | 11 | 17 |
| Free Fluid at 85° C. | 0 | 0 | 10 | 0 | 0 | 0 | 0 | 0 |
| API Fluid Loss at 85° C. | 93 | 204 | 108 | 48 | 51 | 56 | 87 | 168 |

Tests 47 and 48 show that the fluid-loss control of HEC of low/medium molecular weight is worse than at 50° C. (see Tests 40 and 41 in Table 8). As observed at 50° C. the viscosity and yield stress of slurry are too low when AMPS-Acrylamide copolymer is used alone (Test 49). As a consequence the slurry is unstable and develops some free fluid. Tests 50 to 53 show that the rheology and fluid-loss control can be optimized by varying the ratio of HEC of high molecular weight and AMPS-Acrylamide copolymer. Again it is noted that the presence of a small amount of AMPS-Acrylamide copolymer (0.15% BWOC) improves significantly the fluid-loss control without affecting the slurry viscosity (Tests 53 and 54).

Table 10 shows cement slurry properties with TXI Lightweight cement (1380 kg/m$^3$ density –50° C. and 85° C.); concentration of additives is given by weight of cement (BWOC).

TABLE 10

| Test # | 55 | 56 | 57 | 58 | 59 | 60 | 61 |
|---|---|---|---|---|---|---|---|
| Slurry Density (kg/m$^3$) | | | | 1380 | | | |
| Temperature (° C.) | | 50 | | | | 85 | |
| Antifoam Agent | 0.5 | 0.5 | 0.5 | 0.5 | 0.5 | 0.5 | 0.5 |
| Sodium lignosulfonate | 0.15 | 0.15 | 0.15 | 0.15 | 0.15 | 0.15 | 0.15 |
| Sodium salt of a polynaphthalene sulfonate | 0.3 | 0.3 | 0.3 | 0.3 | 0.3 | 0.3 | 0.3 |
| HEC of low/medium Mw | 2 | — | — | 2 | — | — | — |
| HEC of high Mw | — | 0.7 | 0.7 | — | 0.5 | 0.6 | 0.8 |
| AMPS-Acrylamide copolymer | — | 0.3 | — | — | 0.6 | 0.4 | 0.2 |
| Mixing Rheology | | | | | | | |
| 300 rpm | 115 | 77 | 61 | 115 | 61 | 67 | 92 |
| 200 rpm | 84 | 60 | 48 | 84 | 46 | 52 | 75 |
| 100 rpm | 47 | 38 | 30 | 47 | 28 | 33 | 50 |
| 60 rpm | 31 | 27 | 22 | 30 | 19 | 22 | 37 |
| 30 rpm | 17 | 17 | 13 | 16 | 11 | 14 | 24 |
| API Rheology at Temperature | | | | | | | |
| 300 rpm | 67 | 70 | 60 | 38 | 35 | 41 | 56 |
| 200 rpm | 46 | 53 | 44 | 26 | 25 | 31 | 41 |
| 100 rpm | 26 | 32 | 27 | 15 | 14 | 18 | 23 |
| 60 rpm | 16 | 22 | 18 | 10 | 9 | 13 | 16 |
| 30 rpm | 9 | 14 | 11 | 6 | 6 | 8 | 8 |
| Free Fluid at Temperature | 0 | 0 | 0 | 0 | 0 | 0 | 0 |
| API Fluid Loss at Temperature | 116 | 62 | 160 | 333 | 65 | 78 | 116 |

At both temperatures HEC of low/medium molecular weight does not provide good fluid-loss control when used at 2% BWOC (Tests 55 and 58). The combination of HEC of high molecular weight and AMPS-Acrylamide copolymer performs much better at 50° C. (Test 56) and 85° C. (Tests 59 to 61). HEC of high molecular weight can be used alone if a very good fluid-loss control is not mandatory (Test 57), but the fluid-loss control is significantly improved when it is used in combination with AMPS-Acrylamide copolymer (Test 56). The slurry rheology and fluid-loss control can be optimized by varying the ratio between HEC of high molecular weight and AMPS-Acrylamide copolymer (Tests 59 to 61).

The invention claimed is:

1. A cement-slurry composition for cementing a subterranean well, comprising: a hydraulic cement, water, and a combination comprising a hydroxyethylcellulose polymer and a copolymer of acrylamido-methlyl-propane sulfonate and acrylamide wherein the hydroxyethylcellulose polymer has a molecular weight between 800,000 and 1,600,000, and wherein the copolymer of acrylamido-methyl-propane sulfonate and acrylamide has a molecular weight between 600,000 and 1,000,000.

2. The composition of claim 1, wherein the slurry density is less than 1800 kg/m$^3$.

3. The composition of claim 2, wherein the slurry density is between 1300 kg/m$^3$ and 1700 kg/m$^3$.

4. The composition of claim 1, wherein the hydroxyethylcellulose polymer concentration is between 0.1 percent and 0.8 percent by weight of cement.

5. The composition of claim 1, wherein the copolymer of acrylamido-methyl-propane sulfonate and acrylamide is present at a concentration between 0.1 percent and 1 percent by weight of cement.

6. The composition of claim 1, wherein the hydraulic cement is a pozzolanic cement.

7. A method of cementing a subterranean well, comprising the following steps:
 (i) drilling a subterranean well;
 (ii) placing casing inside the wellbore; and
 (iii) pumping the cement-slurry composition of claim 1 into the wellbore and filling the annular space between the casing exterior and borehole wall
 wherein the International Standardization Organization (ISO) /American Petroleum Institute (API) fluid-loss rate of the cement slurry is less than 200 mL/30 min at the anticipated bottomhole circulating temperature.

8. The method of claim 7, wherein the plastic viscosity of the cement slurry is less than 300 cP after mixing.

9. The method of claim 7, wherein the plastic viscosity of the cement slurry after a 20-min conditioning period at the anticipated bottomhole circulating temperature is less than 200 cP.

10. A method to control the rheological properties of a cement-slurry composition for cementing a well, comprising the following steps:
 (i) choosing a hydraulic cement; and
 (ii) mixing a hydroxyethylcellulose polymer, a copolymer of acrylamido-methyl-propane sulfonate and acrylamide, and water with the hydraulic cement in sufficient amounts to prepare a slurry with a plastic viscosity below 300 cP after mixing, and an ISO/API fluid- loss rate below 200 mL/30 min at the anticipated bottomhole circulating temperature.

11. The method of claim 10, wherein the plastic viscosity of the cement slurry after a 20-min conditioning period at the anticipated bottomhole circulating temperature is less than 200 cP.

12. A method to control the fluid-loss rate of a cement-slurry composition for cementing a well, comprising the following steps:
- (i) choosing a hydraulic cement; and
- (ii) mixing a hydroxyethyl-cellulose polymer, a copolymer of acrylamido-methyl-propane sulfonate and acrylamide, and water with the hydraulic cement in sufficient amounts to prepare a slurry with an ISO/API fluid-loss rate less than 200 mL/30 min at the anticipated bottomhole circulating temperature, and a plastic viscosity below 300 cP after mixing.

13. The method of claim 12, wherein the plastic viscosity of the cement slurry after a 20-min conditioning period at the anticipated bottomhole circulating temperature is less than 200 cP.

* * * * *